United States Patent
Aoki et al.

(10) Patent No.: US 9,531,233 B2
(45) Date of Patent: Dec. 27, 2016

(54) MOTOR CONNECTION MODULE FOR SUPPRESSING CONNECTING DEFECTS

(71) Applicant: ASMO CO., LTD., Shizuoka-ken (JP)

(72) Inventors: Yoshio Aoki, Hamamatsu (JP); Nobuo Mizutani, Toyohashi (JP); Tomoaki Ozaki, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 167 days.

(21) Appl. No.: 14/075,932

(22) Filed: Nov. 8, 2013

(65) Prior Publication Data

US 2014/0132095 A1 May 15, 2014

(30) Foreign Application Priority Data

Nov. 13, 2012 (JP) ................... 2012-249298
Aug. 21, 2013 (JP) ................... 2013-171467

(51) Int. Cl.
*H02K 5/22* (2006.01)
*H02K 11/00* (2016.01)
*H02K 7/116* (2006.01)

(52) U.S. Cl.
CPC .............. *H02K 5/225* (2013.01); *H02K 7/116* (2013.01); *H02K 11/0094* (2013.01); *H02K 11/38* (2016.01)

(58) Field of Classification Search
CPC .. H02K 5/225; H02K 11/0084; H02K 11/001; H02K 7/116; H02K 7/1166; H02K 2211/03; H02K 11/01; H02K 11/38
USPC ........................ 310/71, 68 B, 75 R
See application file for complete search history.

(56) References Cited

U.S. PATENT DOCUMENTS

| 4,533,188 A * | 8/1985 | Miniet ................... H05K 3/301 |
| | | 439/76.1 |
| 5,807,121 A * | 9/1998 | Fulop ..................... H01R 9/091 |
| | | 439/82 |
| 2001/0022050 A1 | 9/2001 | Bentz et al. |
| 2002/0079758 A1* | 6/2002 | Matsuyama ........... H02K 5/225 |
| | | 310/68 R |
| 2004/0061391 A1 | 4/2004 | Matsuyama et al. |

(Continued)

FOREIGN PATENT DOCUMENTS

| JP | H02-136980 U | 11/1990 |
| JP | 2001-320853 A | 11/2001 |

(Continued)

*Primary Examiner* — Terrance Kenerly
*Assistant Examiner* — Alexander Singh
(74) *Attorney, Agent, or Firm* — Christensen Fonder P.A.

(57) ABSTRACT

A motor includes a motor unit, a gear housing coupled to the motor unit, and a connector module including a connector housing coupled to the gear housing. The motor unit includes a rotation shaft and a power terminal. The gear housing accommodates a deceleration mechanism that outputs decelerated rotation of the rotation shaft. The connector terminal and the circuit substrate are fixed to the connector housing. The power terminal is connected to a socket of the connector terminal when coupling the connector housing to the gear housing. The connector terminal includes a fixed portion fixed to the connector housing, a substrate connecting portion connected to the circuit substrate, and a supported portion located closer to the socket than the substrate connecting portion. The connector housing includes a terminal supporting portion that supports the supported portion from the rear in the coupling direction.

5 Claims, 6 Drawing Sheets

(56) References Cited

U.S. PATENT DOCUMENTS

| | | | |
|---|---|---|---|
| 2008/0203833 A1* | 8/2008 | Mizutani | H01R 39/38 310/71 |
| 2012/0112579 A1 | 5/2012 | Kokubu | |
| 2012/0161560 A1* | 6/2012 | Mizutani | H02K 5/148 310/71 |
| 2013/0057122 A1 | 3/2013 | Huck | |

FOREIGN PATENT DOCUMENTS

| | | |
|---|---|---|
| JP | 2004-166481 A | 6/2004 |
| JP | 2011-254676 A | 12/2011 |
| JP | 2012-105381 A | 5/2012 |
| WO | WO 2010/130371 A1 | 11/2010 |
| WO | WO 2011/107300 A1 | 9/2011 |

* cited by examiner

MOTOR CONNECTION MODULE FOR SUPPRESSING CONNECTING DEFECTS

BACKGROUND OF THE INVENTION

The present disclosure relates to a motor used as a drive source for a power window device or the like.

PCT International Publication No. WO 2011/107300 discloses a motor including a motor unit, which has a rotation shaft, a gear housing, which is coupled to the motor unit, and a connector module, which has a connector housing coupled to the gear housing. The gear housing accommodates a deceleration mechanism that decelerates and outputs the rotation of the rotation shaft. The connector housing supports a connector terminal, which is connected to a power terminal of the motor unit, and a circuit substrate, which is connected to the connector terminal. The power terminal is inserted into and connected to a socket of the connector terminal when the connector housing is coupled to the gear housing. This structure allows for the connection of the connector terminal and the power terminal of the motor unit to be completed when the connector housing is coupled to the gear housing. Thus, the manufacturing process is simplified.

SUMMARY OF THE INVENTION

However, in the above motor, a large contact load is produced when the power terminal of the motor unit is inserted into the socket of the connector terminal. The load may be applied to the portion where the connector terminal and the circuit substrate are connected. This may cause a connection defect between the connector terminal and the circuit substrate.

It is an object of the present disclosure to provide a motor that suppresses connection defects of the connector terminal and the circuit substrate caused by the contact load produced when connecting terminals.

One aspect of the present invention is a motor provided with a motor unit including a rotation shaft and a power terminal. A gear housing is coupled to the motor unit. The gear housing accommodates a deceleration mechanism that decelerates and outputs rotation of the rotation shaft. A connector module includes a connector terminal connected to the power terminal, a circuit substrate connected to the connector terminal, and a connector housing coupled to the gear housing. The connector terminal and the circuit substrate are fixed to the connector housing. The power terminal is inserted into and connected to a socket of the connector terminal when coupling the connector housing to the gear housing in a coupling direction. The connector terminal includes a fixed portion fixed to the connector housing, a substrate connecting portion connected to the circuit substrate, and a supported portion located closer to the socket than the substrate connecting portion. The connector housing includes a terminal supporting portion that supports the supported portion from a rear side in the coupling direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor will now be described.

Figure 1:
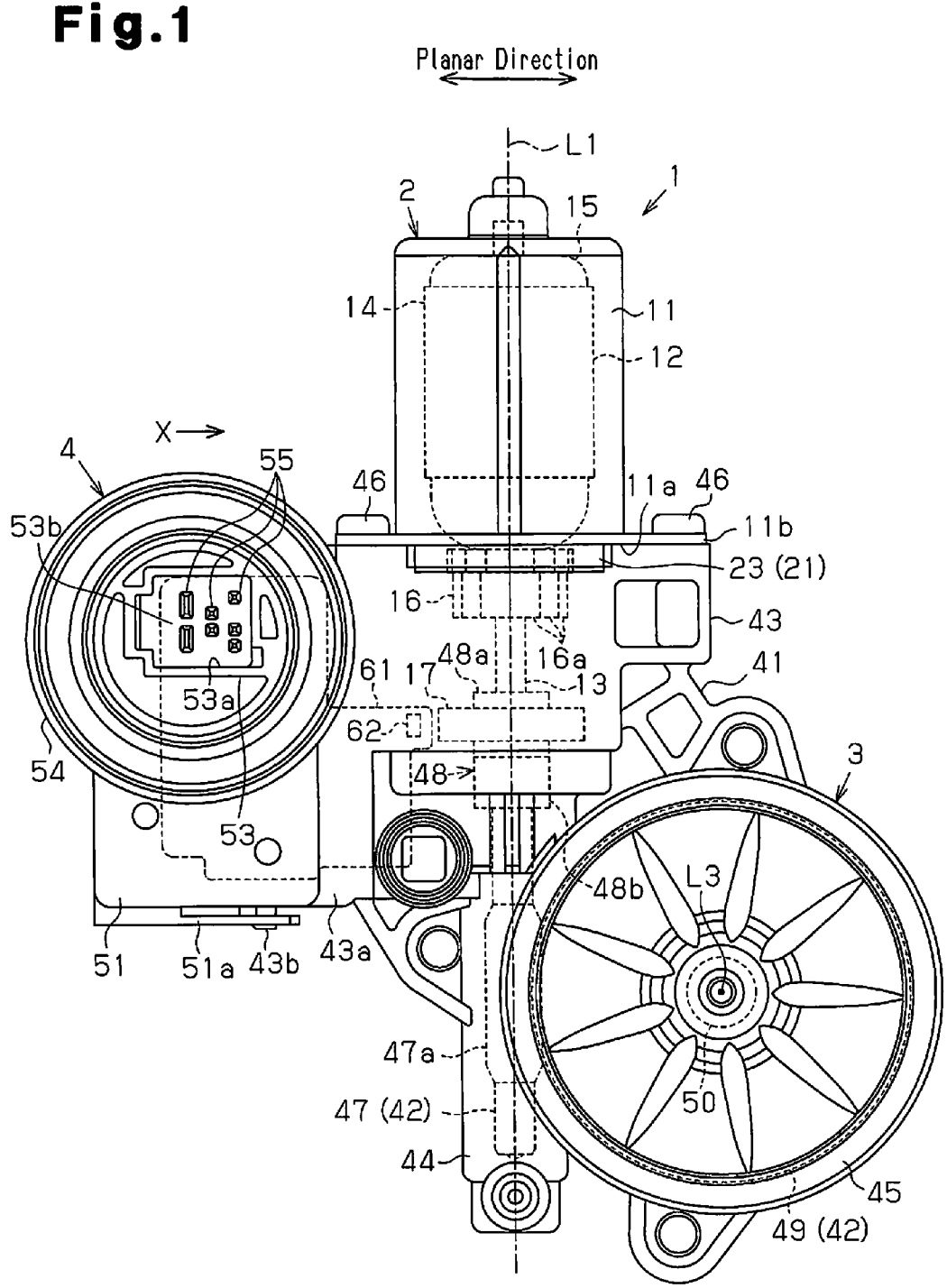
FIG. 1 is a front view showing one embodiment of a motor.

The motor 1 of the present embodiment shown in FIG. 1 is used as a drive source for a power window device that electrically raises and lowers a window glass of a vehicle. The motor 1 includes a motor unit 2, which is shown in the upper section of FIG. 1, a deceleration unit 3, which is arranged on an output side (lower side) of the motor unit 2, and a connector module 4, which is coupled to one side (left side as viewed in FIG. 1) of the deceleration unit 3. The motor 1, as a whole, has a relatively thin profile in a direction (direction perpendicular to plane of FIG. 1) that is perpendicular to the axis of the motor unit 2 (axis L1 of rotation shaft 13). As viewed in the axial direction of the motor 1, the longitudinal direction (left to right direction in FIG. 1) will be referred to as the planar direction, and the direction extending along the short side (direction perpendicular to the plane of FIG. 1) will be referred to as the thicknesswise direction. Thus, the axial direction, the planar direction, and the thicknesswise direction of the motor 1 are directions that are orthogonal to one another.

[Structure of Motor Unit]

A yoke housing 11 (hereinafter simply referred to as yoke 11) of the motor unit 2 is tubular shape and has a closed non-output end (upper end in FIG. 1). An output end 11a of the yoke 11 is open in the axial direction (lower side in FIG. 1) of the motor 1, and a flange 11b extends toward a radially outer side from the output end 11a. Magnets (not shown) are fixed to an inner circumferential surface of the yoke 11, and an armature 12 is arranged at the inner side of the magnets.

The armature 12 includes a cylindrical rotation shaft 13 arranged at a central portion in the radial direction of the yoke 11, an armature core 14 fixed to and rotated integrally with the rotation shaft 13, coils 15 wound around the armature core 14, and a commutator 16 fixed to the rotation shaft 13 closer to the distal end (closer to the lower end in FIG. 1) than the armature core 14.

A basal end (upper end in FIG. 1) of the rotation shaft 13 is axially supported by a bearing (not shown) arranged at the bottom central portion of the yoke 11. A distal end of the rotation shaft 13 projects out of the yoke 11 from the opening in the output end 11a of the yoke 11. The armature core 14 is fixed to the rotation shaft 13 in the yoke 11, and radially faces the magnet (not shown).

The commutator 16 is externally fitted and fixed to the portion of the rotation shaft 13 projecting out of the yoke 11.

The commutator 16 is thus arranged outside the yoke 11 and rotated integrally with the rotation shaft 13. The commutator 16 is cylindrical and includes a plurality of segments 16a arranged next to one another along the outer circumferential surface of the commutator 16 and spaced apart from one another in the circumferential direction. Some of the segments 16a or all of the segments 16a are electrically connected to the coils 15. In other words, power may be supplied to the coils 15 through the segments 16a of the commutator 16.

Figure 2:
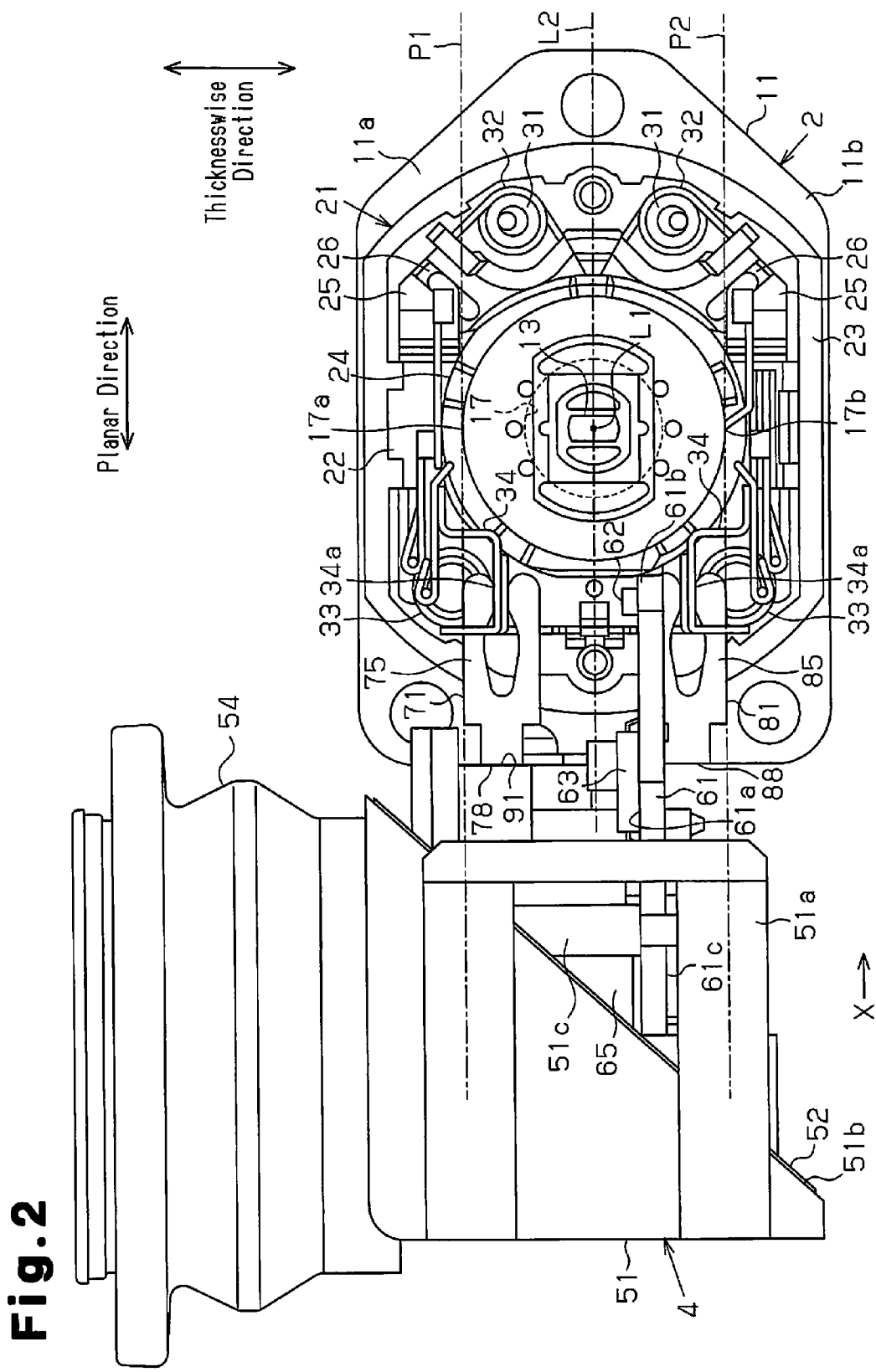
FIG. 2 is a plan view of a motor unit and a connector module of FIG. 1 taken from a gear housing.

As shown in FIG. 2, the motor unit 2 includes a brush holder 21 made of resin at the output end 11a of the yoke 11. The brush holder 21 has a plate-shaped base 22 located outside the output end 11a of the yoke 11. The size of the base 22 in the direction orthogonal to the axis is slightly larger than the opening of the output end 11a. A seal member 23 that ensures a liquid tight seal between a gear housing 41 of the deceleration unit 3, which will be described later, and the yoke 11 is arranged on the outer edge of the base 22. The seal member 23 is made from elastomer, for example.

A commutator accommodation portion 24, which projects in a direction opposite to the yoke 11 along the axial direction, is formed integrally with the base 22 at the central portion of the base 22. The commutator 16 is arranged inside the commutator accommodation portion 24. The commutator accommodation portion 24 thus covers the outer circumference of the commutator 16, and the end face of the commutator 16 at the side opposite (closer to the gear housing 41) to the yoke 11 in the axial direction. The rotation shaft 13 is formed so that the distal end projects from the commutator accommodation portion 24.

Two brush accommodation portions 25 extending toward the radially outer side are formed integrally with the commutator accommodation portion 24. The two brush accommodation portions 25 are arranged to be line symmetric to a hypothetical line L2. The hypothetical line L2 is parallel to the planar direction of the motor 1 and orthogonal to the axis L1 of the rotation shaft 13. Each brush accommodation portion 25 is also integrated with the base 22. Each brush accommodation portion 25 is in communication with the interior of the commutator accommodation portion 24. A power brush 26 is accommodated inside each brush accommodation portion 25 so as to be movable in the radial direction. A distal end (radially inner side end) of the power brush 26 is formed to contact the outer circumferential surface of the commutator 16 in the commutator accommodation portion 24. The commutator accommodation portion 24 reduces the scattering of brush powder that is produced when the power brush 26 is scraped due to the sliding of the commutator 16.

Two support rods 31, which project from the base 22 in the direction opposite of the yoke 11 (direction toward the gear housing 41) in the axial direction, is formed between the two brush accommodation portions 25 in the circumferential direction. In the same manner as the brush accommodation portions 25, the two support rods 31 are formed to be line symmetric relative to the hypothetical line L2. Each support rod 31 has a circular cross-section, and a coil portion of a torsion spring 32 is externally inserted and held by each support rod 31. The torsion spring 32 biases the power brush 26 toward the radially inner side (i.e., toward the commutator 16). Each support rod 31 functions to contact the gear housing 41 in the axial direction and the radial direction and allows for positioning in the axial direction and the radial direction relative to the gear housing 41.

In the brush holder 21, two choke coils 33 and two power terminals 34 are located at opposite sides in the planar direction relative to where the brush accommodation portions 25 and the support rods 31 are located. The choke coils 33 and the power terminals 34 are formed to be line symmetric relative to the hypothetical line L2. Each power terminal 34 is electrically connected to the corresponding power brush 26 by the choke coil 33. The choke coil 33 is a noise reduction element that removes noise from the power supplied to the armature 12. The power terminal 34 is formed from a single sheet of metal and includes an insertion portion 34a connected to connector terminals 71, 81, which will be described later. The insertion portion 34a has a thin profile and is parallel to the planar surface (plane orthogonal to the thicknesswise direction) of the motor 1.

[Structure of Deceleration Unit]

As shown in FIG. 1, the deceleration unit 3 includes the gear housing 41 and a deceleration mechanism 42 accommodated in the gear housing 41. The gear housing 41 includes a holder accommodation portion 43 fixed to the flange 11b of the yoke 11, a worm shaft accommodation portion 44 extending in a direction opposite to the yoke 11 along the direction of the axis L1 of the rotation shaft 13 from the holder accommodation portion 43, and a wheel accommodation portion 45 formed to extend sideward from the worm shaft accommodation portion 44 in the planar direction (right side in FIG. 1).

The gear housing 41 is fixed to the yoke 11 when the holder accommodation portion 43, which contacts the flange 11b from the axial direction, is fixed to the flange 11b by a plurality of screws 46. The distal end of the rotation shaft 13 enters the interior of the holder accommodation portion 43, and the commutator 16 is arranged in the holder accommodation portion 43. Moreover, portions of the brush holder 21 such as the commutator accommodation portion 24, the brush accommodation portion 25, each power terminal 34, and the like projects out of the yoke 11 from the output end 11a of the yoke 11 and enter the interior of the holder accommodation portion 43.

A substantially cylindrical worm shaft 47 is accommodated in the worm shaft accommodation portion 44. A threaded worm portion 47a is formed at the axially central portion of the worm shaft 47. The worm shaft 47 is coaxial with the rotation shaft 13 (arranged so that their center axes coincide), and is rotatably supported inside the worm shaft accommodation portion 44.

The worm shaft 47 and the rotation shaft 13 are coupled by a clutch 48 arranged in the holder accommodation portion 43. The clutch 48 includes a drive side rotating body 48a fixed to the distal end of the rotation shaft 13, and a driven side rotating body 48b fixed to one end in an axial direction of the worm shaft 47 (upper end in FIG. 1). The driven side rotating body 48b is coupled to and rotated integrally with the drive side rotating body 48a. The clutch 48 operates to transmit the rotation of the drive side rotating body 48a to the driven side rotating body 48b, and not to transmit the rotation force of the driven side rotating body 48b to the drive side rotating body 48a. That is, the clutch 48 outputs the rotation input from the rotation shaft 13 to the worm shaft 47, and blocks the rotation input from the worm shaft 47.

An internal space of the wheel accommodation portion 45 is connected to an internal space of the worm shaft accommodation portion 44. A disk-shaped worm wheel 49, which is engaged with the worm portion 47a, is accommodated in the wheel accommodation portion 45. The deceleration mechanism 42 includes the worm shaft 47 and the worm wheel 49. The worm wheel 49 is arranged so that its rotation axis L3 is parallel to the motor thicknesswise direction, and is rotatably supported by the wheel accommodation portion 45. The worm wheel 49 is disk-shaped and is thin in the direction of the axis L3. An output shaft 50, which extends in the axial direction of the worm wheel 49, rotates integrally with the worm wheel 49 at the central portion of the worm wheel 49. A distal end of the output shaft 50 projects out of the gear housing 41, and the window glass of the vehicle is coupled to the distal end of the output shaft 50 by a window regulator (not shown).

A disk-shaped sensor magnet 17 is fixed to the drive side rotating body 48a of the clutch 48. The sensor magnet 17 is coaxial with the axis L1 of the rotation shaft 13, and has a rectangular cross-section in the radial direction. The sensor magnet 17 is formed to be integrally rotatable with the rotation shaft 13 and the drive side rotating body 48a.

[Structure of Connector Unit]

The holder accommodation portion 43 includes a connector attachment portion 43a extending to one side (direction opposite to the wheel accommodation portion 45) in the planar direction. The connector module 4 is attached to the connector attachment portion 43a. The connector module 4 projects out of the center of the motor 1 (axis L1 of the rotation shaft 13) to one side (direction opposite to the extending direction of the wheel accommodation portion 45) in the planar direction.

As shown in FIG. 1, the connector module 4 includes a connector housing 51 made of resin coupled to the connector attachment portion 43a. A hooking piece 51a hooked to a hooking portion 43b of the connector attachment portion 43a is formed on each end face in the motor axial direction in the connector housing 51. The connector housing 51 is fixed to the gear housing 41 when each hooking piece 51a is hooked to the hooking portion 43b. Furthermore, when coupling the connector module 4, the connector housing 51 is coupled along the planar direction (coupling direction X) of the motor 1 with respect to the connector attachment portion 43a.

As shown in FIG. 2, the connector housing 51 includes an opening 51b that opens toward the gear housing 41. The connector attachment portion 43a includes an opening (not shown) that opens toward the connector module 4 in correspondence with the opening 51b, and the edges of both openings are in contact through a seal member 52. This seals the gap between the opening 51b of the connector housing 51 and the opening of the gear housing 41. An end face of the opening 51b of the connector housing 51 is inclined with respect to the motor thicknesswise direction. In other words, a boundary surface of the connector attachment portion 43a and the connector housing 51 is inclined with respect to the motor thicknesswise direction.

At one side surface in the thicknesswise direction of the connector housing 51, an external connection unit 53 is formed to extend in the thicknesswise direction. As shown in FIG. 1, an insertion hole 53a, which extends to the interior of the connector housing 51, is formed in a recessed manner at the external connection unit 53. The insertion hole 53a is recessed in the thicknesswise direction, and the inner surface defining the insertion hole 53a has a shape corresponding to an outer shape of an external connector (not shown) for insertion into the insertion hole 53a. The periphery of the external connection unit 53 is surrounded by a substantially cylindrical connector boot 54. The connector boot 54 is a member for preventing water from entering the insertion hole 53a. The connector boot 54 of the present embodiment is made from elastomer and is integrally molded to the connector housing 51.

As shown in FIG. 2, a plate-shaped control circuit substrate 61 is fixed to the connector housing 51. The connector housing 51 is arranged on the control circuit substrate 61 such that a portion of the control circuit substrate 61 projects from the opening 51b. The connector housing 51 also includes two positioning portions 51c extending in the motor thicknesswise direction. The positioning portion 51c is extended through the control circuit substrate 61, and, for example, the distal end of the positioning portion 51c is thermally deformed (thermally caulked) to fix and position the control circuit substrate 61.

The control circuit substrate 61 is arranged such that the plate surface is orthogonal to the motor thicknesswise direction. In other words, the control circuit substrate 61 is arranged so that its plate surface is parallel to the flat plane of the motor 1. The miniaturization in the motor thicknesswise direction thus can be realized while ensuring the planar area of the control circuit substrate 61.

The control circuit substrate 61 is arranged between a first hypothetical plane P1 and a second hypothetical plane P2 set based on the shape (outer diameter) of the sensor magnet 17. In detail, the first hypothetical plane P1 is a plane that is parallel to the motor planar surface (plane orthogonal to the motor thicknesswise direction) and contacts one end 17a in the motor thicknesswise direction of the sensor magnet 17. The second hypothetical plane P2 is a plane that is parallel to the motor planar surface and contacts the other end 17b in the motor thicknesswise direction of the sensor magnet 17. By arranging the control circuit substrate 61 between the first and second hypothetical planes P1, P2 parallel to the motor planar surface, the control circuit substrate 61 is fitted within the width of the sensor magnet 17 in the motor thicknesswise direction. This miniaturizes the motor 1 in the thicknesswise direction. The insertion portion 34a of the power terminal 34 is also arranged to be fitted between the first and second hypothetical planes P1, P2.

The control circuit substrate 61 is arranged at a position (offset position) deviated in the motor thicknesswise direction relative to the hypothetical line L2, which is parallel to the motor planar direction and orthogonal to the axis L1 of the rotation shaft 13. In other words, the control circuit substrate 61 is arranged between the hypothetical line L2 and one of the first and second hypothetical planes P1, P2 (second hypothetical plane P2 in the present embodiment).

A portion of the control circuit substrate 61 is arranged beside the external connection unit 53 in the motor thicknesswise direction. The external connection unit 53 includes a terminal holding portion 53b (see FIG. 5), and a plurality of connector terminals 55 embedded through insert molding are fixed to the terminal holding portion 53b. One end of each connector terminal 55 is connected to the control circuit substrate 61. The other end of each connector terminal 55 is projected into the insertion hole 53a of the external connection unit 53, and is formed to connect with the external connector inserted into the insertion hole 53a. The input and output of electric signals and the supply of power to the motor 1 are performed through this external connector. The resins forming the insertion hole 53a and the terminal holding portion 53b may have different colors (e.g., black and white) to improve visibility when connecting the external connector. More specifically, the connector boot 54 may obstruct the view of the interior of the connector housing 51 in a direction from the plane of FIG. 1. In such a case, the profile of the terminal holding portion 53b stands out in the insertion hole 53 due to its color (white), which differs from the color of the terminal holding portion 53b. This improves visibility and facilitates the connection of the external connector.

Figure 3:
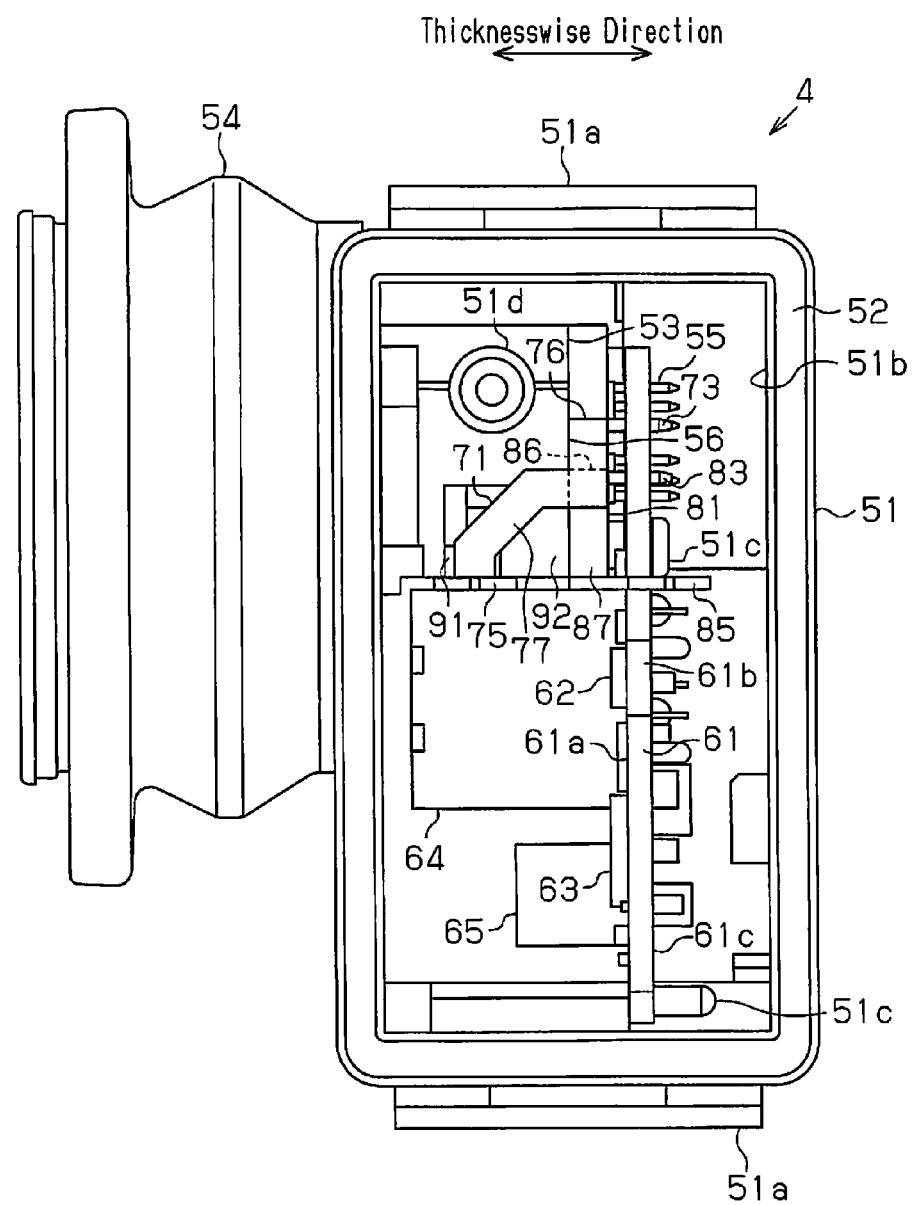
FIG. 3 is a side view of the connector module shown in FIG. 1 taken in the planar direction of the motor.

As shown in FIG. 3, a Hall IC 62 serving as a rotation detection element, a control circuit 63, a relay circuit 64 serving as a drive circuit, and a capacitor 65 serving as a noise reduction element are mounted on a surface 61a (plate surface at the side of the hypothetical line L2) of the control circuit substrate 61. The relay circuit 64 and the capacitor 65 are arranged in a space under the external connection unit 53 in the axial direction.

Figure 4:
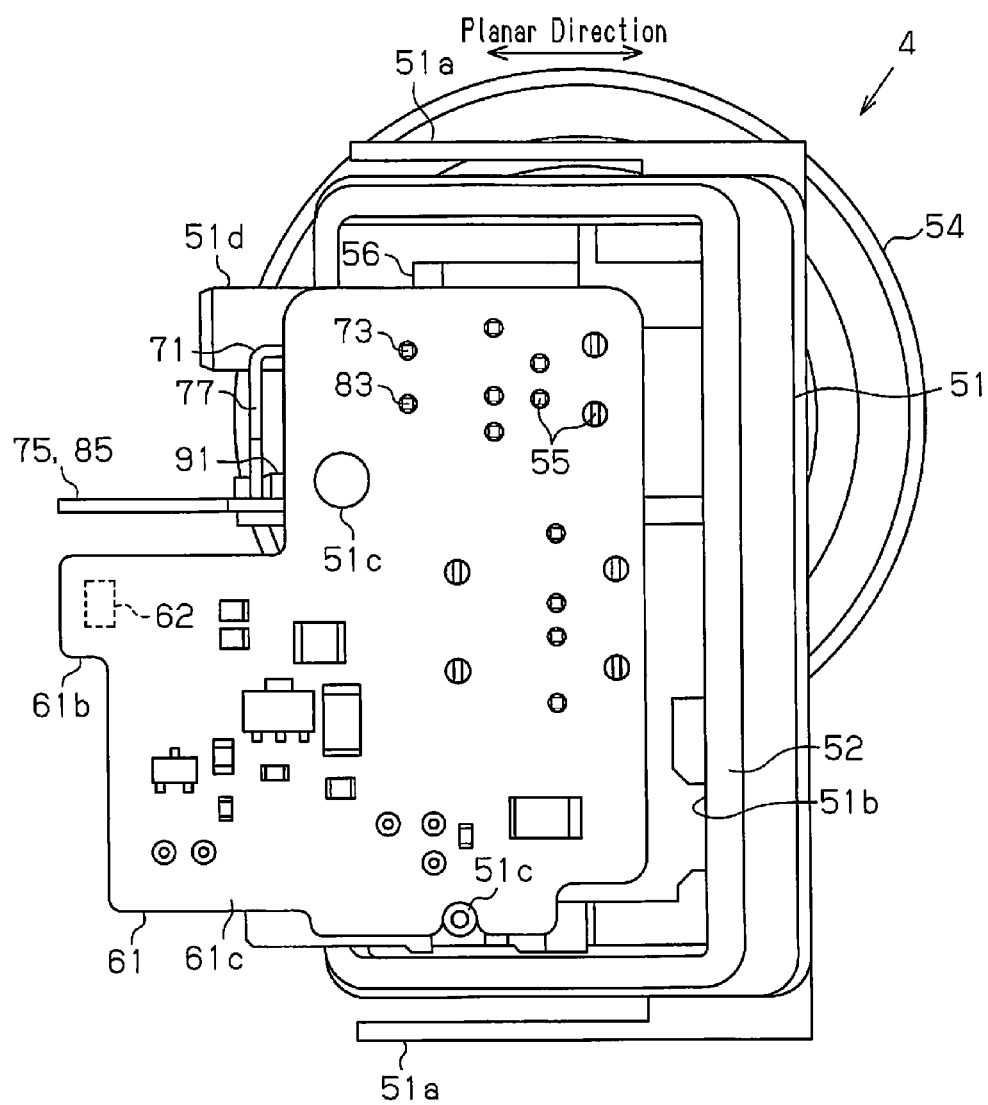
FIG. 4 is a rear view of the connector module shown in FIG. 1 taken in the thicknesswise direction of the motor.

As shown in FIG. 2 and FIG. 4, the control circuit substrate 61 includes an extending portion 61b located at the same position as the sensor magnet 17 in the motor axial direction. The extending portion 61b extends toward the sensor magnet 17 in the motor planar direction and includes a distal end facing the outer circumferential surface of the sensor magnet 17 in the motor planar direction. The Hall IC 62 is arranged on the extending portion 61b. That is, the extending portion 61b extends so that the Hall IC 62 can be arranged in the proximity of the sensor magnet 17.

The Hall IC 62 is arranged at the same location as the sensor magnet 17 in the motor axial direction. The Hall IC 62 is mounted on the plate surface (surface 61a) on the side of the hypothetical line L2 of the control circuit substrate 61. That is, the Hall IC 62 is arranged between the control circuit substrate 61 and the hypothetical line L2, and the control circuit substrate 61 is not arranged between the Hall IC 62 and the sensor magnet 17. The Hall IC 62 is thus arranged proximal to the sensor magnet 17. In the present embodiment, the control circuit substrate 61 and the sensor magnet 17 have the above-described positional relationship. Thus, the surface of the Hall IC 62 mounted on the control circuit substrate 61 (surface parallel to the surface 61a of the control circuit substrate 61) is substantially orthogonal to the rotating direction of the rotation shaft 13.

The Hall IC 62 alternately detects a first magnetic field (vertical magnetic field) that enters the surface (plane parallel to the surface 61a of the control circuit substrate 61) in the vertical direction and a second magnetic field (horizontal magnetic field) that enters the surface in the horizontal direction to generate pulse signals based on the corresponding magnetic fields. The Hall IC 62 outputs the pulse signals of two phases to the control circuit 63. When the sensor magnet 17 is rotating, the pulse signal obtained from the first magnetic field and the pulse signal obtained from the second magnetic field change at a phase difference of 90 degrees (electric angle) with respect to each other. The control circuit 63 detects the rotation information (rotation position (rotation angle), rotating direction, rotation speed, etc.) of the sensor magnet 17 (i.e., rotation shaft 13) based on the pulse signals of two phases. The control circuit 63 then controls the relay circuit 64 based on the rotation information of the rotation shaft 13 to supply drive current to the armature 12. This realizes the desired rotation of the armature 12.

[Connector Terminal]

Figure 5A:
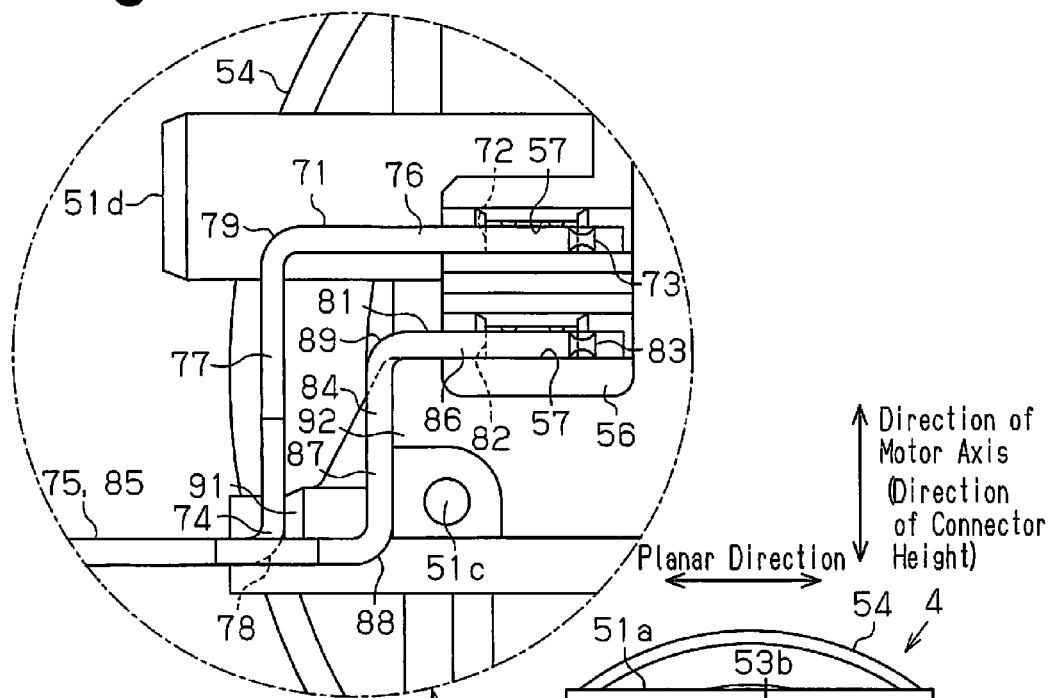
FIG. 5A is an enlarged view of the encircled portion shown in FIG. 5.
Figure 5:
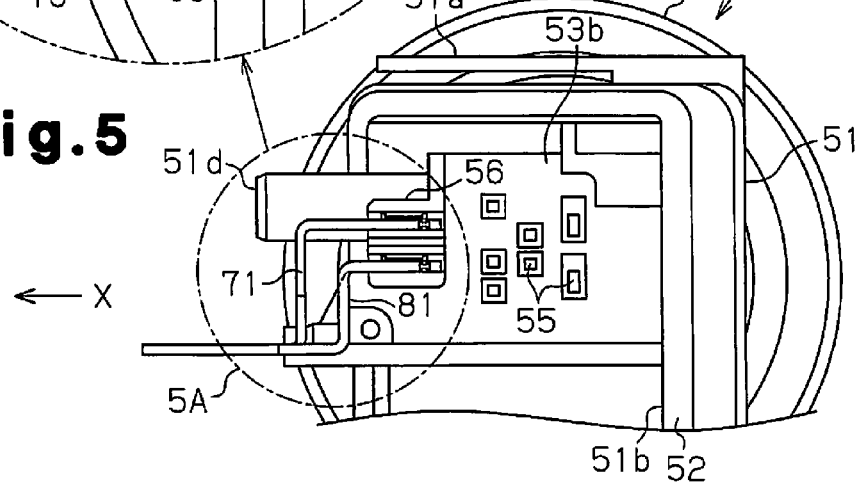
FIG. 5 is a rear view showing a portion of the connector module without a control circuit substrate.

As shown in FIG. 5 and FIG. 5A, a terminal holder 56 for holding two connector terminals 71, 81 (tuning fork terminal) is formed at the side of the gear housing 41 (left side in FIG. 5) of the terminal holding portion 53b in the connector housing 51. The terminal holder 56 projects closer to the rotation shaft 13 with respect to the end face of the opening 51b. A press-fitting projection 51d having a circular cross-section that positions the gear housing 41 relative to the connector attachment portion 43a is formed to project in the coupling direction X of the connector module 4 in the terminal holder 56.

Figure 6:
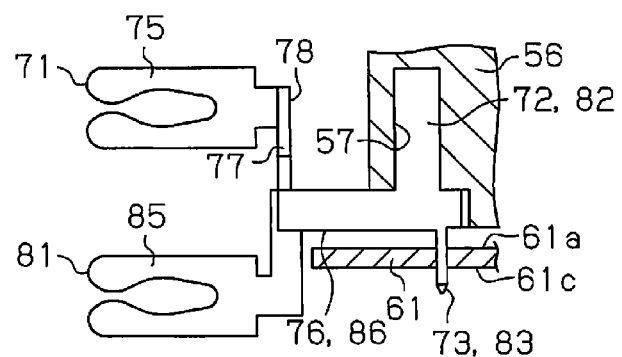
FIG. 6 is a schematic view illustrating a connector terminal.

As shown in FIG. 5A and FIG. 6, two press-fitting recesses 57, to which press-fitting portions 72, 82 (fixed portions) of the connector terminals 71, 81 are press-fitted and fixed, is arranged next to each other in the height direction of the connector module 4 (coincides with the direction of the axis L1 of the rotation shaft 13) in the terminal holder 56. The press-fitting portion 72 of one connector terminal 71 is press-fitted and fixed to the press-fitting recess 57 on the upper side, and the press-fitting portion 82 of the other connector terminal 81 is press-fitted and fixed to the press-fitting recess 57 on the lower side. Each press-fitting recess 57 is recessed in the motor thicknesswise direction.

Each connector terminal 71, 81 is formed by pressing and bending a metal sheet into a predetermined shape. Each connector terminal 71, 81 includes the press-fitting portion 72, 82, a substrate connecting portion 73, 83 connected to the control circuit substrate 61, a supported portion 74, 84, and a bifurcated connecting portion 75, 85 (socket) at the distal end.

In detail, each connector terminal 71, 81 includes a first extending portion 76, 86 extending in the motor planar direction. The first extending portion 76, 86 is orthogonal to the press-fitting portion 72, 82 extending along the motor thicknesswise direction, respectively. Each substrate connecting portion 73, 83 extends in the direction opposite to the press-fitting portion 72, 82 along the motor thicknesswise direction from each first extending portion 76, 86. Each substrate connecting portion 73, 83 extends through the control circuit substrate 61 and is connected by solder and the like to the rear surface 61c of the control circuit substrate 61 (see FIG. 4 and FIG. 6). The substrate connecting portions 73, 83 are arranged in the height direction of the connector module 4.

One substrate connecting portion 73 is formed closer to the basal end (position distant from the bifurcated connecting portion 75) of the first extending portion 76 with respect to the press-fitting portion 72. The other substrate connecting portion 83 is formed closer to the basal end (position distant from the bifurcated connecting portion 85) of the first extending portion 86 with respect to the press-fitting portion 82. In other words, each press-fitting portion 72, 82 is formed closer to the distal end (closer to the bifurcated connecting portion 75, 85) with respect to each substrate connecting portion 73, 83.

As shown in FIG. 3, FIG. 5A, and FIG. 6, each connector terminal 71, 81 includes a second extending portion 77, 87. The second extending portion 77, 87 extends downward through a bent portion 79, 89 bent at a right angle from the distal end of each first extending portion 76, 86. The second extending portion 77 of one connector terminal 71 extends downward and diagonally toward the connector boot 54 from the first extending portion 76. The second extending portion 87 of the other connector terminal 81 extends downward and along the connector height direction from the first extending portion 86 (see FIG. 3). At least part of the second extending portion 77 is the supported portion 74 supported by a first terminal supporting portion 91 formed in the connector housing 51. At least part of the second extending portion 87 is the supported portion 84 supported by a second terminal supporting portion 92 formed in the connector housing 51.

As shown in FIG. 5A, each second extending portion 77, 87 is arranged deviated in the motor planar direction from each other. The lower end of each second extending portion 77, 87 is bent at a right angle toward the gear housing 41 and extended along the motor planar direction. The bifurcated connecting portion 75, 85 is formed at the distal end of each second extending portion 77, 87. That is, one connector terminal 71 is crank-shaped and includes two bent portions 79, 78 arranged between the press-fitting portion 72 and the bifurcated connecting portion 75. The other connector terminal 81 is crank-shaped and includes two bent portions 89, 88 arranged between the press-fitting portion 82 and the bifurcated connecting portion 85. The bent portion 78 at the lower end of the second extending portion 77 and the bent portion 88 at the lower end of the second extending portion 87 are formed at the same location with respect to each other in the connector height direction (motor axial direction). The bifurcated connecting portion 75 of the second extending portion 77 and the bifurcated connecting portion 85 of the second extending portion 87 are formed at the same location with respect to each other in the connector height direction (motor axial direction).

The bifurcated connecting portions 75, 85 formed at the distal ends of the connector terminals 71, 81 are arranged in the motor thicknesswise direction. The bifurcated connecting portion 75 of one connector terminal 71 is located at the side of the surface 61a using the control circuit substrate 61 as a reference. The bifurcated connecting portion 85 of the other connector terminal 81 is extended to be crank-shape in the motor thicknesswise direction from the bent portion 88 at the lower end of the second extending portion 87 and located closer the rear surface 61c of the control circuit substrate 61 than the bifurcated connecting portion 75.

As shown in FIG. 2, the insertion portion 34a of the power terminal 34 arranged in the gear housing 41 is inserted into each bifurcated connecting portion 75, 85. The bifurcated connecting portion 75, 85 sandwiches the insertion portion 34a in the motor thicknesswise direction with its elastic force so that each connector terminal 71, 81 and each power terminal 34 are electrically connected. The control circuit substrate 61 is arranged between the bifurcated connecting portions 75, 85 (specifically, between the connecting area of the bifurcated connecting portion 75 and the insertion portion 34a, and the connecting area of the bifurcated connecting portion 85 and the insertion portion 34a) as viewed from the motor axial direction.

The connector housing 51 includes the first terminal supporting portion 91 for supporting the supported portion 74 of one connector terminal 71, and a second terminal supporting portion 92 for supporting the supported portion 84 of the other connector terminal 81. The first and second terminal supporting portions 91, 92 are formed on the lower side of the press-fitting recess 57.

The second terminal supporting portion 92 is arranged on the rear side in the coupling direction X of the second extending portion 87 of the connector terminal 81. In other words, the second extending portion 87 is arranged along the second terminal supporting portion 92 on the front side in the coupling direction X of the second terminal supporting portion 92. The second terminal supporting portion 92 is in contact with substantially the entire second extending portion 87 along the connector height direction, and supports the second extending portion 87 from the rear side in the coupling direction X. That is, substantially the entire second extending portion 87 is the supported portion 84 supported by the second terminal supporting portion 92.

The first terminal supporting portion 91 is formed closer to the gear housing 41 (front side in the coupling direction X) than the second terminal supporting portion 92. The first terminal supporting portion 91 is arranged on the rear side in the coupling direction X of the second extending portion 77 of the connector terminal 71, and contacts a lower end (near the bent portion 78) of the second extending portion 77. The first terminal supporting portion 91 supports the lower end (supported portion 74) of the second extending portion 77 from the rear side in the coupling direction X. The supported portion 74 supported by the first terminal supporting portion 91 is located on the rear side in the coupling direction X of the bifurcated connecting portion 75. That is, the first terminal supporting portion 91 is formed to support the rear side in the coupling direction X of the bifurcated connecting portion 75.

The armature 12 (rotation shaft 13) of the motor 1 is driven and rotated when supplied with power from the external connector inserted to the insertion hole 53a of the external connection unit 53 via the connector terminal 55, the control circuit substrate 61, the connector terminals 71, 81, and the power terminal 34 of the brush holder 21.

The operation of the present embodiment will now be described.

When the connector module 4 is coupled along the motor planar direction (coupling direction X) to the connector attachment portion 43a of the gear housing 41, the press-fitting projection 51d at the side of the connector module 4 shown in FIG. 5 is first press-fitted into the press-fitting hole (not shown) formed at the inner side of the connector attachment portion 43a. This positions the connector module 4 relative to the connector attachment portion 43a.

Then, the connector module 4 is further pushed in the coupling direction X so that the insertion portion 34a of the power terminal 34 is inserted into the bifurcated connecting portion 75, 85 of each connector terminal 71, 81. The bifurcated connecting portion 75, 85 are thus electrically connected while sandwiching the insertion portion 34a in the motor thicknesswise direction by their elastic force.

In the present embodiment, in the connector terminals 71, 81, the supported portions 74, 84 located closer to the bifurcated connecting portions 75, 85 than the substrate connecting portions 73, 83 are supported from the rear side in the coupling direction X by the first and second terminal supporting portions 91, 92. The contact load that is generated when the insertion portion 34a is inserted to the bifurcated connecting portions 75, 85 is thus received by the first and second terminal supporting portions 91, 92. This suppresses the load applied to the connecting part (substrate connecting portions 73, 83) of the connector terminals 71, 81 and the control circuit substrate 61. As a result, connection defects of the connector terminals 71, 81 and the control circuit substrate 61 caused by contact loads during terminal connection is suppressed.

Further, since the first terminal supporting portion 91 supports the rear side in the coupling direction X of the bifurcated connecting portion 75 in one connector terminal 71, the contact load during connection of the bifurcated connecting portion 75 and the power terminal 34 is received by the first terminal supporting portion 91. As a result, the load applied to the substrate connecting portion 73 is further suppressed.

Moreover, in the connector terminals 71, 81 of the present embodiment, the supported portions 74, 84 between the press-fitting portions 72, 82, which are fixed to the connector housing 51, to the bifurcated connecting portions 75, 85 are supported by the first and second terminal supporting portions 91, 92. That is, deformation of the connector terminals 71, 81 by the contact load during terminal connection is suppressed since they are supported by the first and second terminal supporting portions 91, 92 at locations closer to the bifurcated connecting portions 75, 85. As a result, the interval between the connector terminals 71, 81 is easily maintained. Thus, short-circuits caused by contact between the connector terminals 71, 81 and contact of the connector terminals 71, 81 with the control circuit substrate 61 is suppressed.

The connector terminal 71, 81 of the present embodiment includes a bent location between the press-fitting portions 72, 82 and the bifurcated connecting portion 75 and thus has a shape that is particularly easily deformed by the contact load during terminal connection. Thus, the deformation suppressing effect of the first and second terminal supporting portions 91, 92 is further improved. In the connector terminal 71, the bent portion 78 closest to the bifurcated connecting portion 75 is supported by the first terminal supporting portion 91. Thus, the deformation of the first terminal supporting portion 91 is more effectively suppressed.

In the coupling mode described above, the press-fitting of the press-fitting projection 51$d$ to the press-fitting hole positions the connector module 4 relative to the connector attachment portion 43$a$. Then, the bifurcated connecting portions 75, 85 and the power terminal 34 are elastically contacted with each other and electrically connected. This suppresses connection defects of the bifurcated connecting portions 75, 85 and the power terminal 34 that may occur due to displacement of the connector module 4 and the gear housing 41. Further, when the connector module 4 is further pushed in the coupling direction X after the bifurcated connecting portions 75, 85 and the power terminal 34 are connected, each hooking piece 51$a$ of the connector housing 51 is elastically hooked to each hooking portion 43$b$ of the gear housing 41 so that the connector housing 51 is fixed to the gear housing 41.

The present embodiment has the advantages described below.

(1) When coupling the connector housing 51, one insertion portion 34$a$ of the power terminal 34 is inserted between the bifurcated connecting portion 75 of the connector terminal 71, and the other insertion portion 34$a$ is inserted between the bifurcated connecting portion 85 of the connector terminal 81. The bifurcated connecting portions 75, 85 are respectively connected so as to elastically sandwich the insertion portion 34$a$. Each connector terminal 71, 81 includes the press-fitting portion 72, 82 fixed to the connector housing 51, the substrate connecting portion 73, 83 connected to the control circuit substrate 61, and the supported portion 74, 84 located closer to the bifurcated connecting portion 75, 85 than the substrate connecting portion 73, 83. The connector housing 51 includes the first and second terminal supporting portions 91, 92 for respectively supporting the supported portions 74, 84 from the rear side in the coupling direction X. The contact load produced when the power terminal 34 of the motor unit 2 is inserted into the bifurcated connecting portions 75, 85 is thus received by the first and second terminal supporting portions 91, 92 to suppress the load applied to the connecting part of the connector terminal 71, 81 and the control circuit substrate 61. This suppresses connection defects of the connector terminal 71, 81 and the control circuit substrate 61 caused by the contact load during terminal connection.

(2) The supported portion 74 of the connector terminal 71 is arranged at the rear side in the coupling direction X of the bifurcated connecting portion 75. Since the supported portion 74 at the rear side in the coupling direction X of the bifurcated connecting portion 75 is supported by the first terminal supporting portion 91, the contact load at the time of terminal connection is received in a preferable manner by the first terminal supporting portion 91. As a result, the load applied to the substrate connecting portion 73 is further suppressed.

(3) The press-fitting portions 72, 82 of the connector terminals 71, 81 are arranged closer to the bifurcated connecting portions 75, 85 than the substrate connecting portions 73, 83. Thus, the contact load during terminal connection is received not only by the first and second terminal supporting portions 91, 92 but also by the press-fitting portions 72, 82. Thus, the load applied to the connecting part of the connector terminals 71, 81 and the control circuit substrate 61 is further suppressed.

(4) One of the connector terminals 71 is crank-shaped by the two bent portions 79, 78 arranged between the press-fitting portion 72 and the bifurcated connecting portion 75. The other connector terminal 81 is crank-shaped by the two bent portions 89, 88 arranged between the press-fitting portion 82 and the bifurcated connecting portion 85. This structure improves the degree of freedom for arrangement of the bifurcated connecting portions 75, 85 corresponding to the position of the power terminal 34 (insertion portion 34$a$).

(5) At least part of the second extending portion 77 between the bent portions 79, 78 is formed as the supported portion 74 in the connector terminal 71, and at least part of the second extending portion 87 between the bent portions 89, 88 is formed as the supported portion 84 in the connector terminal 81. Thus, the supported portions 74, 84 are easily configured in the connector terminals 71, 81.

(6) The sockets for the connector terminals 71, 81 are the bifurcated connecting portions 75, 85 having a bifurcated shape. The bifurcated connecting portions 75, 85 are connected to elastically sandwich the power terminal 34 (insertion portion 34$a$). In such a structure, the power terminal 34 is inserted and connected between the bifurcated connecting portions 75, 85 when coupling the connector housing 51. Thus, the connecting structure is simplified.

The above embodiment may be modified as described below.

Figure 7:
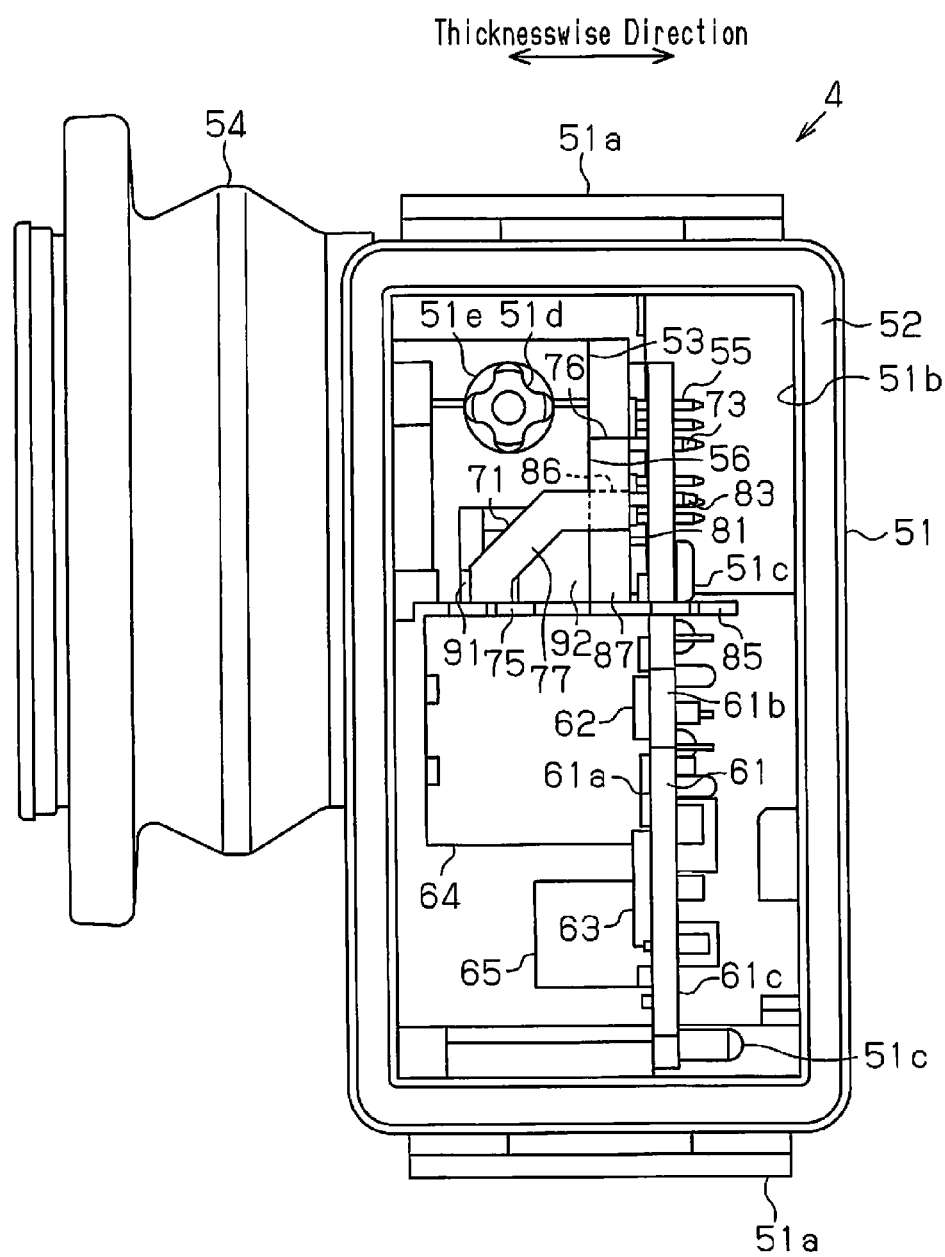
FIG. 7 is a side view of a connector module in another example taken from the planar direction of the motor.

In the embodiment described above, the press-fitting projection 51$d$ for the positioning of the connector module 4 has a circular cross-section but may have a plus-shaped cross-section, as shown in FIG. 7. The contact area of the press-fitting projection 51$d$ with respect to the press-fitting hole becomes smaller by forming the press-fitting projection 51$d$, which is press-fitted to the circular press-fitting hole at the side of the connector attachment portion 43$a$, to have a plus-shaped cross-section. As a result, the insertion load necessary to insert the press-fitting projection 51$d$ into the press-fitting hole may be reduced. In the example shown in FIG. 7, a base portion 51$e$ of the press-fitting projection 51$d$ is formed to have a circular cross-section to ensure the shearing strength of the press-fitting projection 51$d$.

In the connector terminal 81 of the embodiment described above, the supported portion 84 is set at a position deviated in the motor planar direction relative to the bifurcated connecting portion 85. However, the supported portion 84 may be at on the rear side (straight behind) in the coupling direction of the bifurcated connecting portion 85 like the other connector terminal 71.

In the embodiment described above, the press-fitting portions 72, 82 of the connector terminals 71, 81 are arranged closer to the bifurcated connecting portions 75, 85 with respect to the substrate connecting portions 73, 83, but may be arranged on the opposite side (closer to the basal ends of the connector terminals 71, 81) of the bifurcated connecting portions 75, 85 relative to the substrate connecting portions 73, 83.

In the embodiment described above, the direction (press-fitting direction of the press-fitting portions 72, 82 to the press-fitting recess 57) for fixing the connector terminals 71, 81 to the connector housing 51 is orthogonal to the coupling direction X of the connector housing 51. However, for example, the fixing direction of the connector terminals 71, 81 may be parallel to the coupling direction X.

The connector terminals 71, 81 of the embodiment described above include the bent area from the press-fitting portions 72, 82 fixed to the connector housing 51 to the bifurcated connecting portions 75, 85 but may be formed straight along the motor planar direction from the press-fitting portions 72, 82 to the bifurcated connecting portions 75, 85. This obtains the same advantages as the above embodiment in which the first and second terminal supporting portions 91, 92 support, from the rear side in the coupling direction X, the supported portions from the press-fitting portions 72, 82 to the bifurcated connecting portions 75, 85 of the connector terminals 71, 81.

In the embodiment described above, the bifurcated connecting portion 75, 85 of each connector terminal 71, 81 is formed to elastically sandwich the insertion portion 34a of the power terminal 34 in the motor thicknesswise direction but may elastically sandwich the socket in the motor axial direction, for example.

In the connector terminals 71, 81, the structure of the socket to which the power terminal 34 of the motor unit 2 is inserted is not limited to the bifurcated connecting portions 75, 85 of the embodiment described above and may be changed to shapes other than the bifurcated shape as long as the power terminal 34 can be inserted and connected when coupling the connector housing 51.

In the embodiment described above, the connector module 4 is coupled to the gear housing 41 in the direction orthogonal to the axis (motor planar direction) but may be coupled in the motor axial direction, for example.

In the embodiment described above, the present invention is applied to the motor 1 used for the drive source of the power window device but may be applied to a motor used to drive a device other than the power window device such as a vehicle wiper device.

What is claimed is:

1. A motor comprising:
   a motor unit including a rotation shaft and a power terminal, the rotation shaft defining a motor axis and a motor axis direction;
   a gear housing coupled to the motor unit, wherein the gear housing accommodating a deceleration mechanism that decelerates and outputs rotation of the rotation shaft; and
   a connector module including an electrically-conductive connector terminal electrically connected to the power terminal, a circuit substrate connected to the connector terminal, and a connector housing coupled to the gear housing, wherein the connector terminal and the circuit substrate are fixed to the connector housing, wherein
   the power terminal is positioned in, and electrically connected to, an electrical socket of the connector terminal, the socket extending in a planar direction, the planar direction being orthogonal to the motor axis direction,
   the connector terminal includes a fixed portion in direct contact with, and fixed to, the connector housing, a substrate connecting portion connected to the circuit substrate, and a supported portion located closer to the socket than the substrate connecting portion in the planar direction, wherein the fixed portion is located closer to the socket than the substrate connecting portion in the planar direction, and the supported portion is located closer to the socket than the fixed portion in the planar direction and extends orthogonally to the socket in the motor axis direction, and
   the connector housing includes a terminal supporting portion that supports the supported portion in the planar direction, such that the supported portion is between the terminal supporting portion and the socket.

2. The motor according to claim 1, wherein the supported portion of the connector terminal is arranged at the rear side of the socket in the planar direction.

3. The motor according to claim 1, wherein the connector terminal is crank-shaped and includes a plurality of bent portions between the fixed portion and the socket.

4. The motor according to claim 3, wherein the supported portion is at least part of an extending portion extending between adjacent ones of the bent portions in the connector terminal.

5. The motor according to claim 1, wherein the socket of the connector terminal includes a bifurcated connecting portion having a bifurcated shape, and the bifurcated connecting portion elastically sandwiches the power terminal.

* * * * *